United States Patent
Tulino et al.

(10) Patent No.: US 9,509,774 B2
(45) Date of Patent: Nov. 29, 2016

(54) DEVICES AND METHODS FOR NETWORK-CODED AND CACHING-AIDED CONTENT DISTRIBUTION

(71) Applicants: Antonia Tulino, Red Bank, NJ (US); Jaime Llorca, Red Bank, NJ (US)

(72) Inventors: Antonia Tulino, Red Bank, NJ (US); Jaime Llorca, Red Bank, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 232 days.

(21) Appl. No.: 14/514,938

(22) Filed: Oct. 15, 2014

(65) Prior Publication Data

US 2015/0207895 A1 Jul. 23, 2015

Related U.S. Application Data

(60) Provisional application No. 61/930,072, filed on Jan. 22, 2014.

(51) Int. Cl.
*H04L 29/08* (2006.01)
*G06F 17/30* (2006.01)
*H04L 12/26* (2006.01)
*H04L 12/721* (2013.01)

(52) U.S. Cl.
CPC ..... *H04L 67/1097* (2013.01); *G06F 17/30902* (2013.01); *H04L 43/045* (2013.01); *H04L 43/062* (2013.01); *H04L 45/14* (2013.01); *H04L 67/06* (2013.01); *H04L 67/2833* (2013.01); *H04L 67/2842* (2013.01); *H04L 67/2847* (2013.01); *H04L 67/32* (2013.01); *H04L 67/327* (2013.01); *H04L 67/36* (2013.01)

(58) Field of Classification Search
CPC ... H04L 43/045; H04L 43/062; H04L 45/14; H04L 67/06; H04L 67/2833
See application file for complete search history.

(56) References Cited

U.S. PATENT DOCUMENTS

| 2010/0128918 | A1* | 5/2010 | MacWan | ............... | H04N 21/63 382/100 |
| 2012/0320824 | A1* | 12/2012 | Bari | ...................... | H04L 63/08 370/328 |

(Continued)

OTHER PUBLICATIONS

M. Chaudhry and A. Sprintson, "Efficient algorithms for index coding," *Computer Communications Woerkshops, IEEE Conference*. Apr. 2008. XP 031273967.

(Continued)

*Primary Examiner* — Dang Ton
*Assistant Examiner* — Sai Aung
(74) *Attorney, Agent, or Firm* — Harness, Dickey & Pierce, P.L.C.

(57) ABSTRACT

A method for transmitting data files in a network includes receiving requests from destination devices for packets of the data files. The method includes constructing a conflict graph such that (i) each packet requested by each destination device is represented by a distinct vertex in a plurality of vertices of the conflict graph, (ii) the plurality of vertices are associated with the destination devices, and (iii) links are created between the plurality of vertices based on which of the plurality of vertices represent a same requested packet and which requested packets are stored in caches belonging to destination devices. The method includes assigning the plurality of vertices to groups based on the links. The method includes coloring the plurality of vertices based on the assigning. The method includes combining the packets represented by vertices having a same color. The method includes sending the combined packets.

20 Claims, 7 Drawing Sheets

(56) References Cited

U.S. PATENT DOCUMENTS

2012/0323986 A1* 12/2012 Sayko .................. H04N 21/222
709/201
2015/0039784 A1* 2/2015 Westphal .............. H04L 45/306
709/240

OTHER PUBLICATIONS

Z. Gao et al. "Network coding based schemes for imperfect wireless packet retransmission problems: A divide and conquer approach." *Wireless Personal Communications, Kluwer Academic Publishers, DO.* vol. 62(4). Aug. 2010. XP 35004245.
M. Laguna and R. Mart, "A GRASP for coloring sparse graphs," *Computational Optimization and Applications*, vol. 19, No. 2, pp. 165-178, 2001.
J. Llorca, A.M. Tulino, K. Guan, and D. Kilper, "Network-coded caching-aided multicast for efficient content delivery," in *ICC, 2013 Proceedings*. IEEE, 2013.
International Search Report mailed Apr. 8, 2015 for corresponding International Application No. PCT/US2015/010992.
Written Opinion of the International Searching Authority mailed Apr. 8, 2015 for corresponding International Application No. PCT/US2015/010992.
C. Avanthay, A. Hertz, and N. Zufferey, "A variable neighborhood search for graph coloring," *European Journal of Operational Research*, vol. 151, pp. 379-388, 2003.
T.A. Feo and M.G.C. Resende, "Greedy randomized adaptive search procedures," *Journal of Global Optimization*, vol. 6, pp. 109-133, 1995.
P. Festa and M.G.C. Resende, "An annotated bibliography of GRASP—Part I: Algorithms," *International Transactions in Operational Research*, vol. 16, No. 1, pp. 1-24, 2009.
P. Festa and M.G.C. Resende, "An annotated bibliography of GRASP—Part II: Applications," *International Transactions in Operational Research*, vol. 16, No. 2, pp. 131-172, 2009.
M. Garey and D. Johnson, "The Complexity of Near-Optimal Coloring," *Journal of the ACM*, vol. 23, pp. 43-49, 1976.
P. Hansen, M. Labbé, and D. Schindl, "Set covering and packing formulations of graph coloring: algorithms and first polyhedral results," *Discrete Optimizatio*, vol. 6, pp. 135-147, 2009.
A. Blasiak, R. Kleinberg, and E. Lubetzky, "Index coding via linear programming," arXiv:1004.1379, 2010.
Cisco, "The Zettabyte Era-Trends and Analysis," 2014.
M. Ji, G. Caire, and A.F. Molisch, "The throughput-outage tradeoff of wireless one-hop caching networks," arXiv:1302.2168, 2013.
M. Ji, A.M. Tulino, J. Llorca, and G. Caire, "On the average performance of caching and coded multicasting with random demands," arXiv:1402.4576, 2014.
M.A. Maddah-Ali and U. Niesen, "Fundamental limits of caching," arXiv:1209.5807, 2012.
M. A. Maddah-Ali and U. Niesen, "Decentralized caching attains order-optimal memory-rate tradeoff," arXiv:1301.5848, 2013.

\* cited by examiner

Adj(i) = (j,k,x,y):
C = 0:
c = yellow:

FIG. 7B

Adj(i) = (j,k,x,y):
C = {yellow, blue}
c = yellow:

FIG. 7C

Adj(i) = (j,k,x,y):
C = (blue, green, red, gray):
c = yellow:

FIG. 7D

Adj(i) = (j,k,x,y):
C = (blue, green, red, gray):
c = blue:

DEVICES AND METHODS FOR NETWORK-CODED AND CACHING-AIDED CONTENT DISTRIBUTION

CROSS-REFERENCE TO RELATED APPLICATIONS

This application claims priority under 35 U.S.C. §119(e) to provisional U.S. application No. 61/930,072 filed on Jan. 22, 2014, the entire contents of which are incorporated herein by reference.

BACKGROUND

Currently, content distribution networks (CDNs) face capacity and efficiency issues associated with the increase in popularity of on-demand audio/video streaming. One way to address these issues is through network caching and network coding. For example, conventional content distribution network (CDN) solutions employ centralized algorithms for the placement of content copies among caching locations within the network. Conventional solutions also include cache replacement policies such as LRU (least recently used) or LFU (least frequently used) to locally manage distributed caches in order to improve cache hit ratios. Other conventional solutions use random linear network coding to transfer packets in groups, which may improve throughput in capacity-limited networks.

However, conventional network caching and network coding solutions do not consider the relative efficiency of caching and transmission resources. This leads to suboptimal cost per delivered object or file. Moreover, conventional content delivery solutions do not exploit the possible combined benefits of network caching and network coding.

SUMMARY

According to at least one example embodiment, a method for transmitting data files in a network includes receiving requests from destination devices for packets of the data files. The method includes constructing a conflict graph such that (i) each packet requested by each destination device is represented by a distinct vertex in a plurality of vertices of the conflict graph, (ii) the plurality of vertices are associated with the destination devices, and (iii) links are created between the plurality of vertices based on which of the plurality of vertices represent a same requested packet and which requested packets are stored in caches belonging to destination devices. The method includes assigning the plurality of vertices to groups based on the links. The method includes coloring the plurality of vertices based on the assigning to label the requested packets. The method includes combining the packets represented by vertices having a same color. The method includes sending the combined packets.

According to at least one example embodiment, the links are created such that a link between a first and a second of the plurality of vertices if (i) the first and second vertices do not represent a same packet, and (ii) a packet represented by the first vertex is not stored in a cache of a destination device associated with the second vertex, or the packet represented by the second vertex is not stored in a cache of a destination device associated with the first vertex.

According to at least one example embodiment, the groups indicate a number of links to the plurality of vertices.

According to at least one example embodiment, the coloring includes determining which of the plurality of vertices have a fewest number of links and which of the plurality of vertices have a greatest number of links. The coloring includes calculating a threshold value based on the number of links to the vertex with the fewest number of links and number of links to the vertex with the greatest number of links. The coloring includes constructing a subset of the plurality of vertices based on the threshold value.

According to at least one example embodiment, the coloring includes selecting a vertex from the subset, determining colors of vertices linked to the selected vertex, and coloring the selected vertex based on the determining.

According to at least one example embodiment, the determining colors identifies colors of vertices linked to the selected vertex as a first set of colors and existing colors of the conflict graph as a second set of colors. The coloring the selected vertex includes coloring the selected vertex with a desired color in the second set if the first set of colors and the second set of colors do not coincide, and coloring the selected vertex with a new color if the first set of colors and the second set of colors coincide.

According to at least one example embodiment, the coloring is performed until the plurality of vertices are colored.

According to at least one example embodiment, the method includes updating the second set of colors to include colors of the plurality of colored vertices.

According to at least one example embodiment, the method includes performing a local search on the plurality of colored vertices to reduce the number of colors in the second set. The local search includes selecting a color from existing colors of the conflict graph, identifying vertices with the selected color, and replacing the selected color with a different color chosen from the existing colors if the vertices linked to the identified vertices are not colored with the different color.

According to at least one example embodiment, the combining performs exclusive-OR operations or other linear combination operations on the packets represented by the vertices having the same color.

It should be understood that the above methods may be performed by a network element (e.g., a content source) in a communications network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processors (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a special purpose processor or special purpose processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 1:
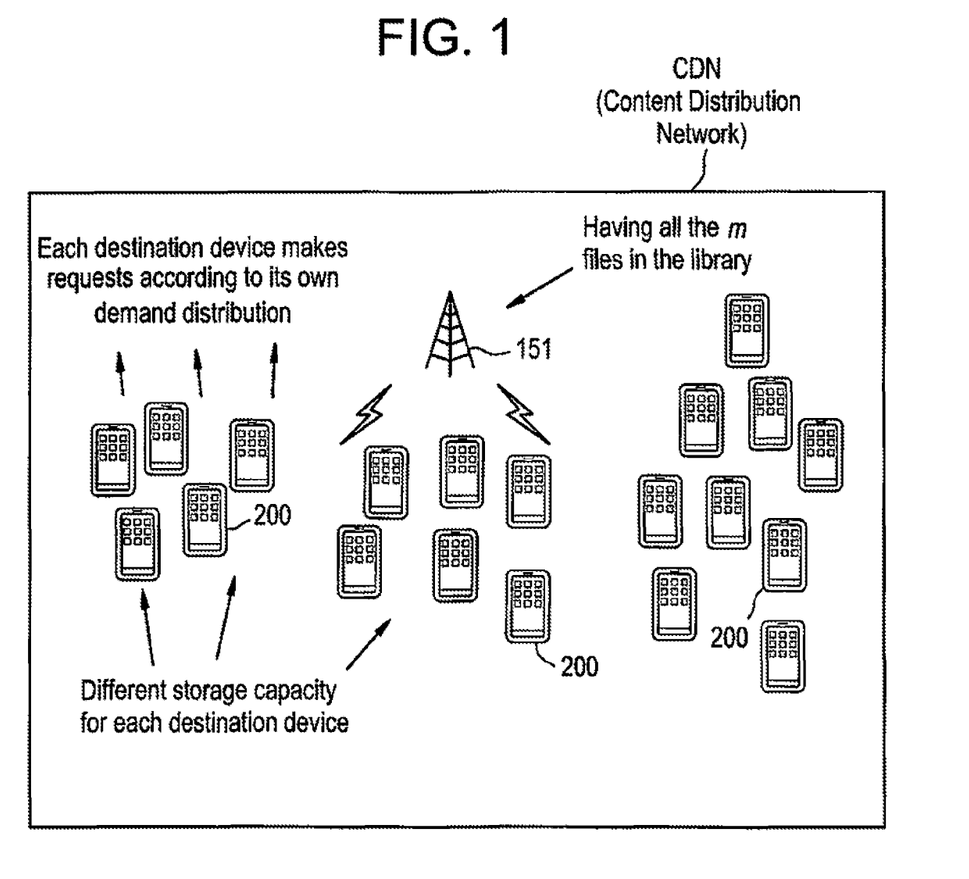
FIG. 1 shows a content distribution network according to at least one example embodiment.

FIG. 1 shows a content distribution network according to at least one example embodiment.

As shown in FIG. 1, a content distribution network (CDN) may include the network element 151 connected to a plurality of destination devices 200. The network element 151 may be a content source (e.g., a multicast source) for distributing data files (e.g., movie files). The destination devices 200 may be end user devices requesting data from the content source. For example, each destination device 200 may be part of or associated with a device that allows for the user to access the requested data. For example, each destination device 200 may be a set top box, a personal computer, a tablet, a mobile phone, or any other device associated used for streaming audio and video. Each of the destination devices 200 may include a memory for storing data received from the network element 151. The structure and operation of the network element 151 and destination devices 200 will be described in more detail below with reference to FIGS. 2 and 3.

Figure 2:
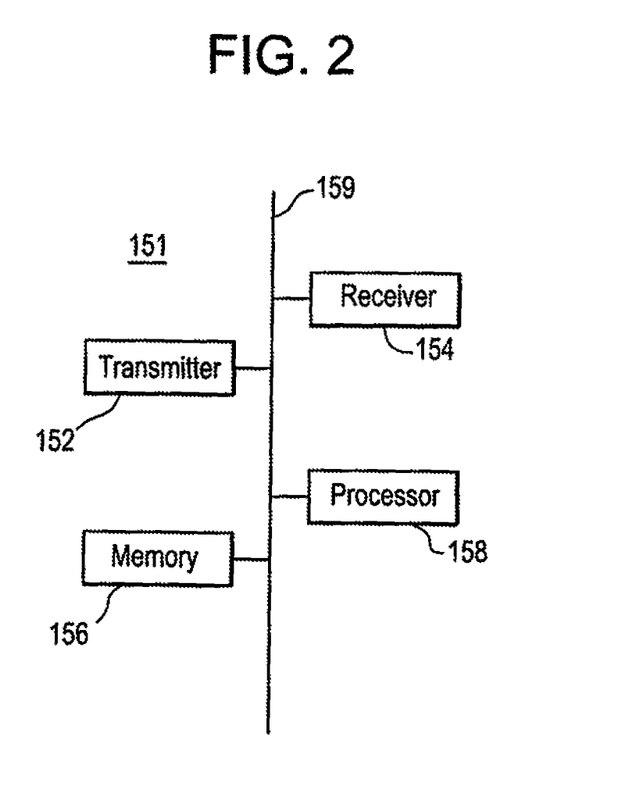
FIG. 2 is a diagram illustrating an example structure of network element according to an example embodiment.

FIG. 2 is a diagram illustrating an example structure of network element according to an example embodiment. According to at least one example embodiment, the network element 151 may be configured for use in a communications network (e.g., the content distribution network (CDN) of FIG. 1). Referring to FIG. 2, the network element 151 may include, for example, a data bus 159, a transmitter 152, a receiver 154, a memory 156, and a processor 158. Although a separate description is not included here for the sake of brevity, it should be understood that each destination device 200 may have the same or similar structure as the network element 151.

The transmitter 152, receiver 154, memory 156, and processor 158 may send data to and/or receive data from one another using the data bus 159. The transmitter 152 is a device that includes hardware and any necessary software for transmitting wireless signals including, for example, data signals, control signals, and signal strength/quality information via one or more wireless connections to other network elements in a communications network.

The receiver 154 is a device that includes hardware and any necessary software for receiving wireless signals including, for example, data signals, control signals, and signal strength/quality information via one or more wireless connections to other network elements in a communications network.

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code. For example, it should be understood that the modifications and methods described below may be stored on the memory 156 and implemented by the processor 158 within network element 151.

Further, it should be understood that the below modifications and methods may be carried out by one or more of the above described elements of the network element 151. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

Figure 3A:
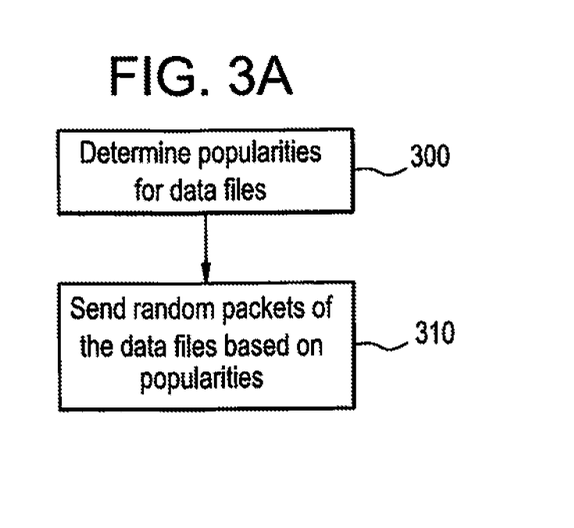
FIGS. 3A-3B are flow charts illustrating example operations of the network element in FIG. 2.
Figure 3B:
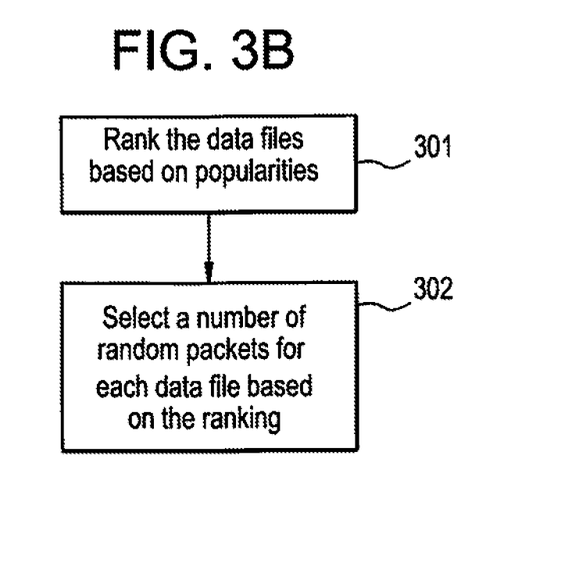
Figure 4:
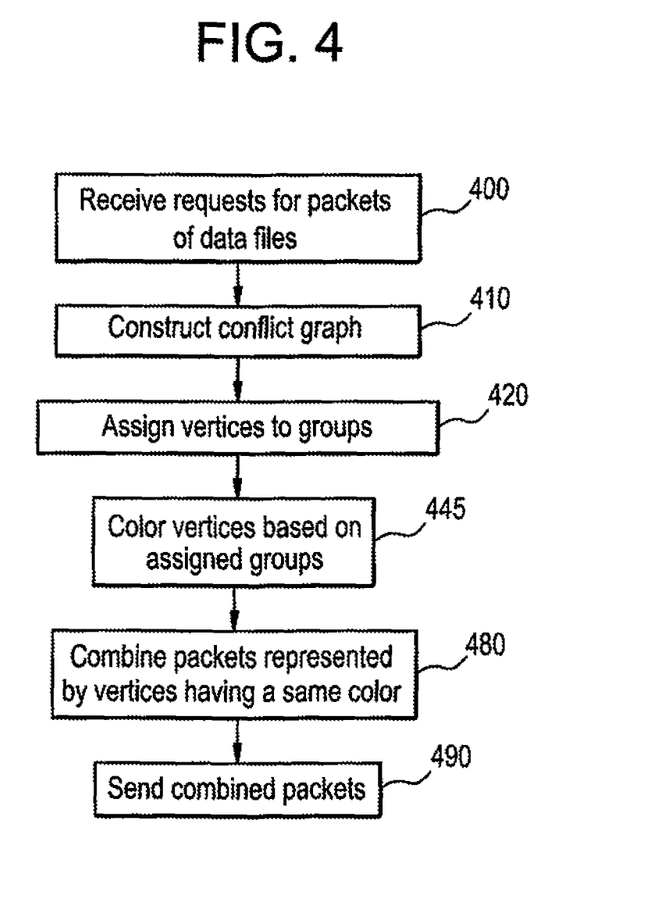
FIG. 4 illustrates example operations for a delivery phase according to at least one example embodiment.
Figure 5:
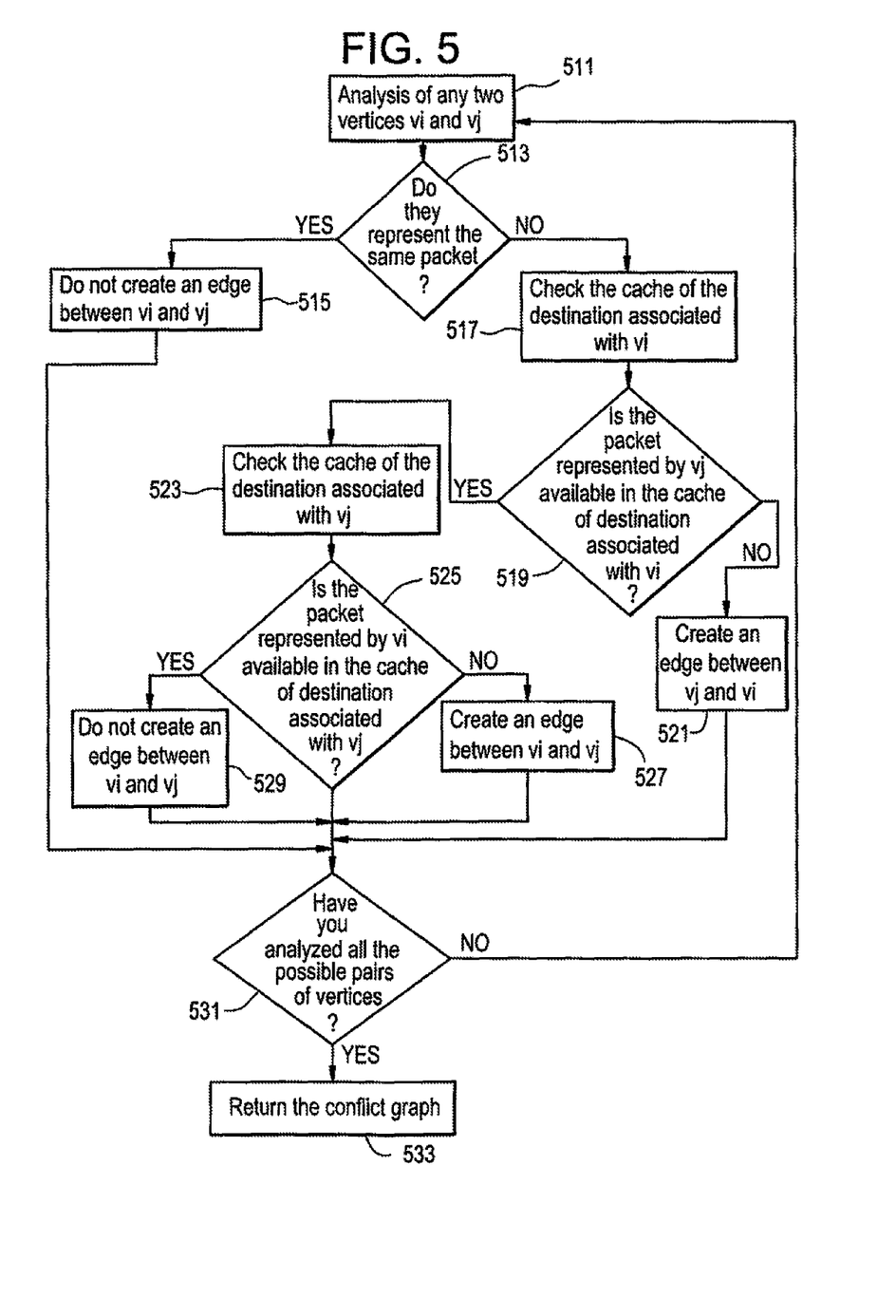
FIG. 5 illustrates example operations for constructing an undirected conflict graph according to at least one example embodiment.
Figure 6:
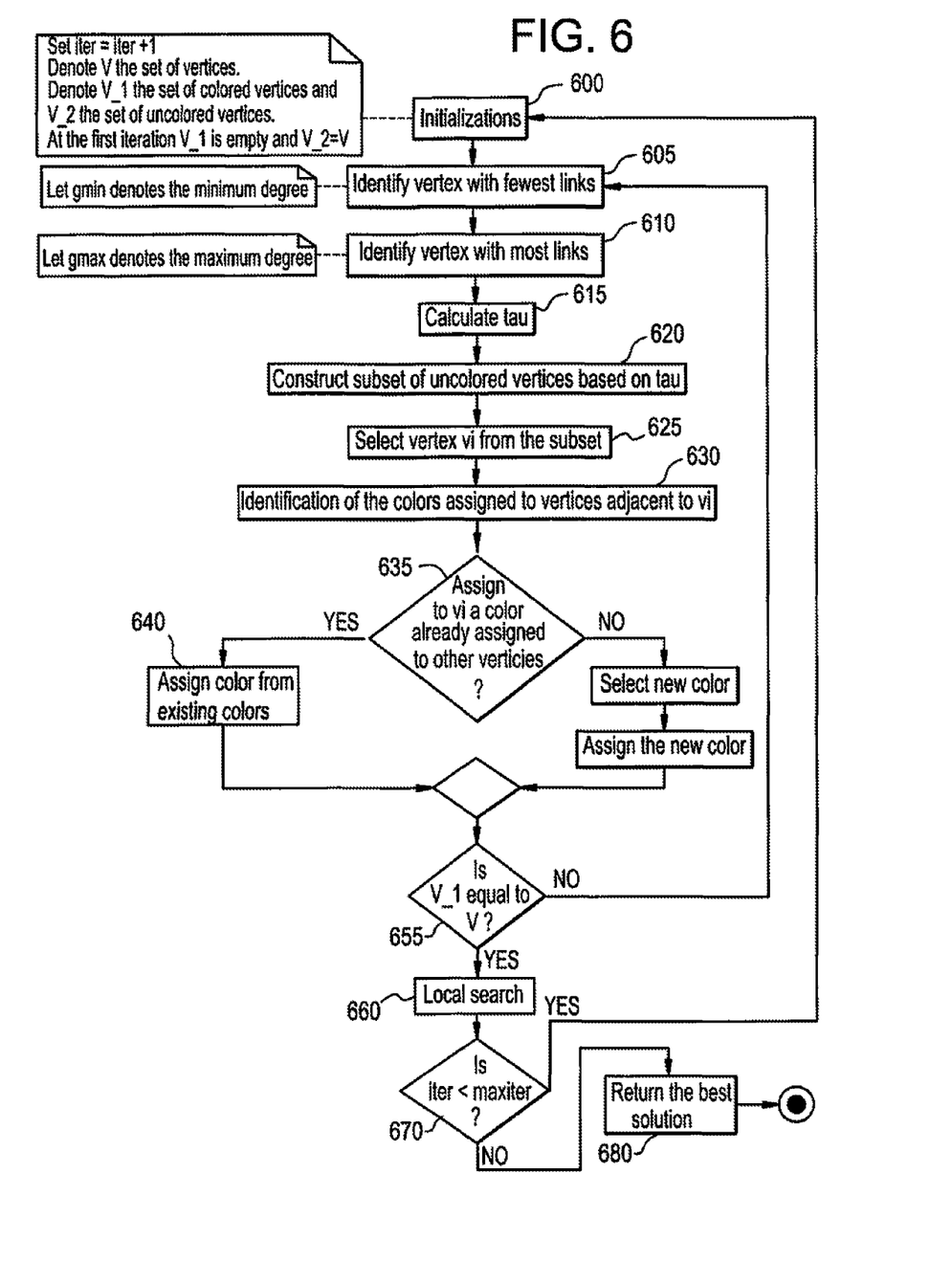
FIG. 6 illustrates example operations for coloring a conflict graph according to at least one example embodiment.

FIGS. 3A-3B are flow charts illustrating example operations of the network element in FIG. 2. For example, FIGS. 3A-3B show example operations for carrying out a method of caching in a communications network. FIGS. 4-6 show example operations for delivering data files after the caching method has been performed.

It should be understood that FIGS. 3A-3B are for carrying out a caching distribution method related to Algorithm 1 below, where each data file 'f' is divided into 'B' equal-size packets, represented as symbols of a finite field and belongs to library 'F':

---
Algorithm 1: Caching algorithm
1 for $f \in F \rightarrow$
2   Each user u caches a subset of
    $p_{u,f} M_u B$ distinct packets of file $f$
    uniformly at random;
3 endfor
4   M = $\{M_{u,f},$ with u = 1, ...,n,and f = 1,...,m\};
5 return(M );
end Caching algorithm
---

In Algorithm 1, '$p_u = [p_{u,1}, \ldots p_{u,m}]$' is the caching distribution of the 'u' destination device 200, where, $\Sigma_{f=1}^{m} p_{u,f} = 1$, $\forall u$ with u=1, . . . , n, and $0 \leq p_{u,f} \leq 1/M_u$, $\forall f=1, \ldots, m$, u=1, . . . , n, 'm' is the number of files hosted by the network element 151, and '$M_u$' is the storage capacity of the cache at destination device 'u' (i.e., destination device 200) and $M_{u,f} = p_{u,f} M_u B$ denotes the packets of file f cached at user u. The network element 151 carries out Algorithm 1 such that destination device, 'u', device 200 caches $M_{u,f} = p_{u,f} M_u B$ packets of file 'f'. Furthermore, the randomized nature of Algorithm 1 allows network element 151 to perform operations such that, if two destinations caches the same number of packets for a given file 'f', then each of the two destination device 200 caches different packets of the same file 'f'. Algorithm 1 may be implemented by network element 151 according to the operations described in FIGS. 3A-3B below.

Referring to FIG. 3A, in operation 300, the network element 151 may determine popularities for a plurality of data files. The data files may be, for example, video and/or audio files. The network element 151 may determine the popularities based on requests for the plurality of data files from at least one of destination devices 200 (e.g., user requests). The user requests may form a demand distribution for the data files. The network element 151 may determine the popularities according to a demand distribution of all the destination devices 200. In this case, the demand distribution may follow a Zipf distribution. Alternatively, the network element 151 may determine the popularities on a per destination device basis where each destination device 200 has as associated demand distribution.

The network element 151 may determine the popularities based on a number of requests for the data files from the destination devices 200. For example, the network element 151 determines a data file that is requested 100 times by the destination devices 200 as having a higher popularity than a data file that is requested 50 times. Thus, the popularities may be based on which data files are most often requested and viewed by users of the destination devices 200.

The network element 151 may divide each data file into a plurality of packets. For example, the network element 151 may divide each data file in to a same number of packets (e.g., three packets). Accordingly, in operation 310, the network element 151 may send random packets of the plurality of data files to at least one destination device based on the popularities determined in operation 300. For example, the network element 151 may send random packets of each data file to destination devices 200 such that the random packets are stored (or cached) at each destination device 200.

The network element 151 may send the random packets such that each destination device 200 receives a given number of random packets for at least one of the data files based on the determined popularities and input parameters (e.g., number of destination devices, popularity distribution, cache size of each destination device, size of the data file library at network element 151, etc.). For example, the network element 151 may send a same number of packets to each destination device 200 if the destination devices 200 have a same size cache and a same demand distribution (e.g., the destination devices are homogeneous). In one example, assume that there are two destination devices 1 and 2 and two files A and B, divided into ten packets. If (i) destination devices 1 and 2 request file A and file B with the same frequency and file A is requested by both destinations with more frequency than file B, and (ii) the two destination devices 1 and 2 have the same cache size, for example six units in terms of packets, then the network element 151 will perform the caching method such that both destination devices 1 and 2 cache four packets of file A and two packets of file B.

If the network element 151 determined the popularities on a per destination device basis in operation 300, then the network element 151 may send the random packets on a per destination device basis in operation 310. For example, the network element 151 may send a different number of packets to each destination if the destinations devices 200 have different size caches or different demand distributions. In this case, referring to the example above, destination device 1 could receive seven packets of file A and three packets of file B while destination device 2 could receive two packets of file A and five packets of file B. This could be due the fact that destination device 1 requests file A much more than file B and has total cache size of ten units in terms of packets, while destination 2 device requests file A much less than file B and has a total cache size of seven units in terms of packets.

FIG. 3B illustrates example operations of the network element 151 that may be carried out between operations 300 and 310, if desired. For example, following operation 300 in FIG. 3A, the network element 151 may rank the data files based on the determined popularities. For example, in operation 301, the network element 151 may rank the data files from a most popular data file to a least popular data file using the popularities determined in operation 300.

In operation 302, the network element 151 may select, for each data file, a number of random packets based on the ranking. For example, the network element 151 selects a different number of random packets for each destination 200 and for each of the data files according at least one of a respective rank of each data file and input parameters of the network (e.g., number of destination devices, popularity distribution, cache size of each destination device, size of the data file library at network element 151, etc.). After operation 302, the network element 151 may proceed back to operation 310 in FIG. 3A to send the selected number of random packets for each data file.

It should be appreciated that operation 302 may include the network element 151 dividing the ranked data files into at least a first subset and a second subset based on at least one threshold value. The at least one threshold value may be based on empirical evidence and/or user defined. The first subset may contain higher ranked data files than the second subset. Thus, in operation 310, the network element 151 may send the selected number of random packets for only the data files in the first subset. This may allow for a more efficient caching of the packets at the destination devices 200 and reduce the number of transmissions during delivery compared to conventional multicasting techniques.

It should be understood that the operations described with reference to FIGS. 3A and 3B allow for improved performance of the network because of the scheme's ability to cache more packets of the more popular files, increase (or alternatively, maximize) the amount of distinct packets of each file collectively cached by the destination devices 200, and reduce the number of transmissions during delivery compared to conventional multicasting techniques.

In conjunction with the above described caching methods, this application discloses example methods for a delivery phase in which requested packets of data files are delivered to destination devices 200. Example methods for the delivery phase are based on graph theory.

FIG. 4 illustrates example operations for a delivery phase according to at least one example embodiment. With reference to FIG. 4, in operation 400, the network element 151 receives requests from destination devices 200 (or user devices) for packets of the data files. Since the network element 151 has already performed the caching method described above, each destination device 200 requests only those packets that were not cached (or stored) as a result of the caching method. Thus, the delivery phase consists of providing to each destination device 200 the missing part(s) of the requested files, i.e., the packets missing from that destination device's 200 memory.

In operation 410, the network element 151 constructs the conflict graph with a plurality of vertices such that each packet requested by each destination device 200 is represented by a distinct vertex in a plurality of vertices of the conflict graph. Thus, even if a same packet is requested by K different users, the packet is represented as K different vertices in the conflict graph. In other words, each vertex in the conflict graph is associated with a unique pair of a destination device 200 and a requested packet. Thus, it may be said that each vertex of the conflict graph is associated with a destination device 200 and represents a packet requested by that destination device 200. Further, the network element 151 may construct the conflict graph based on which of the plurality of vertices represent a same requested packet and which requested packets are stored in caches belonging to the destination devices 200. Operation 410 is described in further detail below with reference to FIGS. 5 and 6.

Still referring to FIG. 4, in operation 420, the network element 151 may assign the plurality of vertices to groups. Each group may indicate a number of links to the plurality of vertices. For example, each vertex may have a given number of links to surrounding vertices. In one example, if vertex A and vertex B each have three links to other vertices and vertex C and vertex D each have four links to other vertices, then vertices A and B belong to one group (e.g., group 3) and vertices C and D belong to a different group (e.g., group 4).

In operation 445, the network element 151 colors the plurality of vertices as a way of labeling the requested packets on the conflict graph. For example, the network element 151 colors the plurality of vertices based on the groups assigned in operation 430. Operation 445 is discussed in further detail below with respect to FIG. 6.

In operation 480, the network element 151 combines the requested packets represented by vertices having a same color. For example, the network element 151 performs exclusive-OR (XOR) operations (or other linear combination operations over a finite field) on the packets represented by the vertices having the same color.

In operation 490, the network element 151 sends the combined packets. For example, the network element 151 sends the combined packets to the destination devices 200 via a multicast transmission. By combining packets prior to transmission it should be understood that delivery methods according to at least one example embodiment may reduce the number of transmissions of the network element 151 which may reduce consumption and improve network efficiency. It should be understood that the destination devices 200 may receive and decode the transmitted combined packets using the XOR operations (or other linear combinations over a finite field). For example, the destination devices 200 may decode the combined packets using packets stored in the cache as keys.

FIG. 5 illustrates example operations for constructing a conflict graph according to at least one example embodiment. For example, FIG. 5 discusses operation 410 from FIG. 4 in further detail. FIG. 5 illustrates example operations for constructing an undirected conflict graph. The undirected conflict graph may be used in conjunction with a coloring scheme referred to in this application a greedy random algorithm search procedure (GRASP) coloring scheme. This coloring scheme is described in more detail below with reference to FIG. 6.

Referring to FIG. 5, in operation 511, the network element 151 analyzes two vertices 'Vi' and 'Vj' from the plurality of vertices populated in operation 410. If, in operation 513, the network element determines that vertices Vi and Vj represent a same requested packet, then the network element 151 does not create a link (or edge) between the two vertices in operation 515. Then, the network element 151 proceeds to operation 531 to determine whether all of the vertices in the conflict graph have been analyzed.

If, in operation 513, the network element 151 determines that the vertices Vi and Vj do not represent a same requested packet, then the network element 151 proceeds to operation 517 and checks the cache (or memory) of the destination device 200 associated with vertex Vi which is requesting the packet represented by vertex Vi. If, in operation 519, the network element 151 determines that the packet representing vertex Vj is not available in the cache of the destination device 200 associated with vertex Vi which is requesting the packet represented by vertex Vi, then the network element 151 creates a link between vertex Vi and vertex Vj in operation 521. Then, the network element 151 proceeds to operation 531 to determine whether all of the vertices in the conflict graph have been analyzed.

If, in operation 519, the network element 151 determines that the packet representing vertex Vj is available in the cache of the destination device 200 associated with vertex Vi which is requesting the packet represented by vertex Vi, then the network element 151 checks the cache of the destination device 200 associated with vertex Vj which is requesting the packet represented by vertex Vj in operation 523. If, in operation 525, the packet representing vertex Vi is not available in the cache of the destination device 200 associated with vertex Vj which is requesting the packet represented by the vertex Vj, then the network element 151 creates a link between vertices Vi and Vj in operation 527 before proceeding to operation 431 to determine whether all of the vertices in the conflict graph have been analyzed.

If, in operation 525, the network element 151 determines that the packet representing vertex Vi is available in the cache of the destination device 200 associated with vertex Vj which is requesting the packet represented by the vertex Vj, then the network element 151 does create a link between vertices Vi and Vj in operation 529. Then, the network element 151 proceeds to operation 531 to determine whether all of the vertices in the conflict graph have been analyzed.

Once the network element 151 has analyzed all of the vertices in the conflict graph, then the network element 151 returns the constructed conflict graph in operation 533.

In view of FIG. 5, it should be understood that the constructing operation 410 in FIG. 4 may summarized by an operation of creating a link between a first and a second of the plurality of vertices if (i) the first and second vertices do not represent a same packet, and (ii) the packet represented by the first vertex is not stored in the cache of the user device associated with the second vertex, or the packet represented by the second vertex is not stored in a cache of a user device associated with the first vertex.

FIG. 6 illustrates example operations for coloring a conflict graph according to at least one example embodiment. In this application, the coloring scheme may be referred to as a greedy randomized algorithm search procedure (GRASP) coloring scheme. The operations in FIG. 6 may correspond to the algorithms below. The general GRASP coloring scheme algorithm is below:

```
algorithm GRASP_GraphColoring (MaxIterations, V, E, d, Adj(−), f (−))
1  c_best := ∅; f(c_best) := +∞;
2  V := sort(V);
3  for k=1 to MaxIterations →
4      C := ∅;
5      β := random [0,1];
6      c := BuildGreedyRandAdaptive(β, V , E, d, Adj(−), f(−), C)
7      c* := LocalSearch(V , E, c, f(c), C );
8      if (f(c*) < f(c_best) ) then
9          c_best := c*;
10         f(c_best) := f(c*);
11     endif
12 endfor
13 return(c_best);
end GRASP_GraphColoring
```

The function "BuildGreedyRandAdaptive" is defined as:

```
function BuildGreedyRandAdaptive(β, V, E, d, Adj(−), f(−) , C)
1  c := ∅;
2  for j = 1 to |V| →
3      RCL := MakeRCL (β, V , E, d, c);
4      i := SelectIndex (RCL);
5      c := GetColor ( V , E, i, C, Adj(−), c);
6      c[i] := c;
7      if (c ∈ C) then
8          C := C∪{c};
9          f(c) := |C|;
10     endif
11 endfor
12 return(c);
end BuildGreedyRandAdaptive
```

The function "MakeRCL" is defined as:

```
function MakeRCL (β, υ, ε, d, c)
1  g_min := min_{i∈V\c} d(i);
2  g_max := max_{i∈V\c} d(i);
3  τ := g_min + [β · (g_max − g_min)];
4  RCL := {i ∈ V\c | d(i) ≥ τ};
5  return(RCL);
end MakeRCL
```

The function "GetColor" is defined as:

```
function GetColor (V , E, i, C, Adj(-), c)
1  L := ∅;
2  for each j ∈ Adj(i) L := L∪{c[i]};
3  if ( C\L≠∅) then
4     c' := SelectColor (C\L);
5  else
6     c' := NewColor (C);
7  endif
8  return(c');
end GetColor
```

The function "LocalSearch" is defined as:

```
function LocalSearch(V , E, c , f(c), C)
1  for each c ∈ C →
2     G_c := {i∈V|H[i] = c};
3     B :=∅;
4     c := c;
5     for each i ∈ G_c →
6        A := ∅;
7        for each j E Adj(i) A := A∪j;
8        if (C\A≠∅) then
9           c' := SelectColor (C\A);
10          c[i] := c';
11          B := B∪{i};
12       endif
13    endfor
14    if (|B| = |G_c|) then
15       c := c;
16       C := C\{c};
17       f(c) := |C|;
18    endif
19 endfor
20 return(c);
end LocalSearch
```

In the pseudo code above, $H_{M,W}=(V,E)$ represents the (undirected) conflict graph, where V and E denote the set of vertices and edges (or links), respectively, of the undirected conflict graph $H_{M,W}$ constructed as discussed above with reference to FIG. 5. In $H_{M,W}$, for each vertex i∈V, Adj(i)= {j∈V|[i,j]∈E}. $c_{best}$ is denoting the best association color-vertex found by the algorithm. Let d(i)=|Adj(i)|, for all i∈V, be the degree of (or number of links to) vertex i. Let $c_{best}=\emptyset$ be the solution under construction, i.e., the set of vertices already assigned to a color (initially an empty set), and let C=∅ (initially an empty set) be the set of colors that are associated to at least a vertex in $c_{best}$. At each iteration, the following operations are performed:
 1. Let d(i)=|Adj(i)|, for all i∈V, be the degree of (or number of links to) vertex i. Let $c_{best}=\emptyset$ be the solution under construction (initially empty), i.e., the set of vertices already assigned to a color, and let C=∅ (initially empty) be the set of colors that are associated to at least a vertex in $c_{best}$.
 2. Select at random uniformly in [0,1] the parameter β.
 3. Compute (see Function MakeRCL):
    $g_{min}$, the minimum greedy value:

$$g_{min} = \min_{i\in V\backslash c} d(i);$$

$g_{max}$, the maximum greedy value:

$$g_{max} = \max_{i\in V\backslash c} d(i);$$

a threshold value tau (τ):

$$\tau=g_{min}+[\beta\cdot(g_{max}-g_{min})], \text{where } \beta\in[0,1]; \text{ and}$$

RCL as the subset of candidate uncolored vertices whose degree is at least τ:

$$RCL=\{i\in V\backslash c|d(i)\geq\tau\};$$

Figure 7A:
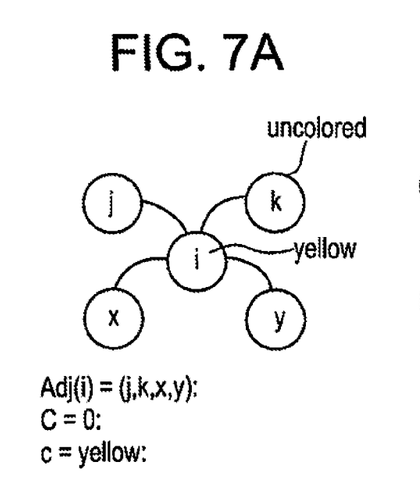
FIGS. 7A-7D illustrate coloring a conflict graph according to at least one example embodiment.
Figure 7B:
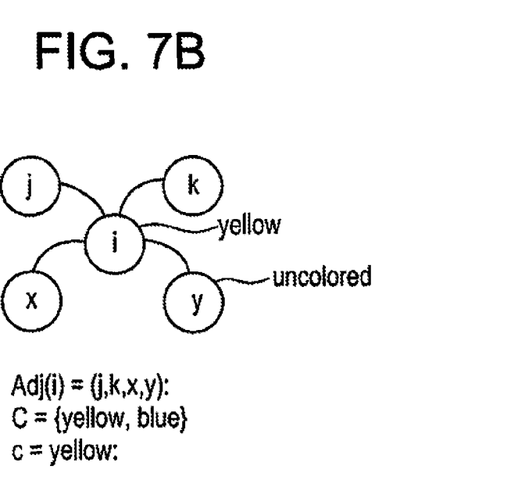

4. Perform the following operations until all the vertices are colored:
    a. A vertex i is randomly selected from the RCL ((see line 4 of the function BuldGreedyRandAdaptive, i.e. i=SelectIndex(RCL)). Note that the value of β∈[0,1] determines the percentage of greediness versus randomness in the choice of the vertices to be inserted in the RCL at each iteration. For example, for β=1, the choice is totally greedy and only vertices with degree $g_{max}$ are inserted in to RCL. As another example, for β=0, the choice is totally random and all candidate vertices are inserted in to RCL (i.e., RCL=W);
    b. Selected vertex i, and analyze its adjacent vertices (see function GetColor); four possible scenarios may occur:
        I. all adjacent vertices are still uncolored and the set C=∅: in this case, a new color c is assigned to vertex i and C=C∩{c} (FIG. 7A);
        II. all adjacent vertices are still uncolored and the set C≠∅: in this case, vertex i is colored with the first color c∈C available (FIG. 7B);
        III. at least one adjacent vertex is colored with a color c∈C and all currently used colors c∈C are already assigned to at least an adjacent vertex: in this case, vertex i is colored with a new color c' and C=C∩{c'} (FIG. 7C); and
        IV. at least one adjacent vertex is colored with a color c∈C and there is a color c'∈C that has not been assigned to any adjacent vertex: in this case, vertex i is colored with color c' (FIG. 7D).
    c. Vertex i is inserted into the solution under construction (c[i]=c' or c[i]=c, according to scenarios (I) to (IV) and the objective function value coherently updated (i.e., f(c)=|C|).
 5. Once all the vertices of the conflict graph are colored, then the function BuldGreedyRandAdaptive returns the solution $c_{best}$.
 6. A local search is implemented which takes as input $c_{best}$ and returns a new valid color c* (see Function LocalSearch). Iteratively, for each color c∈C computes the set $G_c$ of all vertices colored with color c (line 2 of the Function LocalSearch) and performs the following steps:
    a. For each vertex i∈$G_c$, search vertices Adj(i), i.e., the vertices adjacent to vertex i. If there is a color c'∈C, c'≠c, not assigned to any adjacent vertex j∈Adj(i), then vertex i becomes colored with color c';
    b. Color c is removed from the set C if and only if it was possible to replace c associated with each vertex i∈$G_c$ with some color c', c'≠c
 7. If the number of colors used in c* is smaller than the number of colors used in $c_{best}$ then set $c_{best}$ equal to c*, otherwise keep $c_{best}$ as the partial solution. (see lines 8-12 of the GRASP algorithm).
 8. Repeat all the above operation 1 to 7 until k=MaxIterations and return $c_{best}$ as the solution.

From the above description, it should be appreciated that the GRASP coloring scheme performs a desired number of iterations, until a stopping criterion is met (such as, for example, a maximum number of iterations or a desired running time). At each iteration, a greedy-randomized adaptive solution c is built starting from c as an initial solution, and a local search phase is performed returning a locally optimal solution c*. At the end of the iterations, the best locally optimal solution $c_{best}$ (i.e., the solution corresponding to the best function objective value $f(c_{best})$) is returned as final solution and the algorithm stops.

The GRASP coloring scheme is able to tackle problem instances characterized by any graph topology, density/sparsity, and any size. The local search strategy checks for redundant colors by focusing on each vertex, one at a time.

The above algorithms will now be described with reference to FIG. 6. In operation 600, the network element 151 sets initial conditions. For example, the network element 151 sets a number of iterations "maxiter" that will be performed for the GRASP coloring scheme. The number of iterations "maxiter" may be user defined and/or based on empirical evidence. In the following operations, 'V' is the set of vertices of the conflict graph, 'V_1' is the set of colored vertices, and 'V_2' is the set of uncolored vertices. At the first iteration, V_1 is empty and V_2=V.

In operation 605, the network element 151 determines which of the vertices in V have a fewest number of links (or edges) based on the assigned groups as 'gmin'. For example, if there are groups 2 to 6, where group 2 vertices have two links, group 3 vertices have three links, and so on, then two links is the fewest number of links to a vertex for the entire conflict graph, and gmin is set as '2.' In operation 610, the network element 151 determines which of the vertices in V have a greatest number of links (or edges) based on the assigned groups as 'gmax'. In the example above, gmax may be set to '6' since the largest group number is group 6, meaning that the greatest number of links to any one of the vertices in the conflict graph is 6 links. In operation 615, the network element 151 calculates a threshold, tau, based on 'gmin' and 'gmax'. For example, the network element 151 may calculate the threshold such that tau=gmin+β(gmax−gmin), where β is a constant that is user defined and/or based on empirical evidence (e.g., β may be chosen uniformly at random within [0,1].

In operation 620, the network element 151 may construct a subset (or a restricted candidates list "RCL") of uncolored vertices belonging to groups having a number of links greater than or equal to the threshold tau. It should be understood that the value of β depends on the amount of "greediness" versus the amount of "randomness" in the choice of the vertices to be included in the subset. For example, for β=1, the choice is completely greedy since only those vertices with a greatest number of links will be included in the subset. If, for example, β=0 then all vertices will be included in the subset.

In operation 625, the network element 151 selects (e.g., randomly selects) a vertex "Vi" from the subset created in operation 620. In operation 630, the network element 151 identifies the colors of vertices that are adjacent (or linked) to vertex Vi as a first set of colors. As part of operation 630, the network element 151 may also identify the existing colors of the conflict graph as a second set of colors. In operation 635, the network element 151 determines if an existing color of the conflict graph can be assigned to vertex Vi. For example, in operation 640, the network element 151 colors vertex Vi with a desired color from the second set if the first set of colors and the second set of colors do not coincide. Otherwise, in operation 645, if the first set of colors and the second set of colors coincide, then the network element 151 selects a new color, and in operation 650 assigns the new color to vertex Vi and includes the new color in the set of colors existing for coloring the conflict graph. Operation 635 is discussed in more detail below with reference to FIGS. 7A-7C.

In operation 655, the network element 151 determines whether the all of the vertices are colored. If not, then the network element 151 returns to operation 605. If so, then the network element 151 performs a local search (e.g., the LocalSearch algorithm above) in operation 660 to reduce the number of colors used for the conflict graph (i.e., reduce the number of colors from set V_1). For example, the network element 151 may select a color from existing colors of the conflict graph, identify vertices with the selected color, and replace the selected color with a different color chosen from the existing colors if vertices linked to the identified vertices are not colored with the different color. Thus, the selected color is eliminated from the set of existing colors.

In operation 665, the network element may select the best solution (i.e., the solution that results in a fewest number of colors used for the conflict graph) from solutions generated by the local search. In operation 670, the network element 151 determines whether the current iteration "iter" is less than the number of iterations "maxiter" set in operation 600. If so, then the network element 151 returns to operation 600 and increments the number of iterations "iter" by one (i.e., sets iter=iter+1). As part of operation 670, the network element 151 may store a result of the local search in a memory (where the result is a colored conflict graph). If the network element 151 determines that the current number of iterations "iter" is equal to "maxiter", then the network element 151 proceeds to operation 680 and returns the best solution from among the stored solutions found by each iteration. For example, the network element 151 returns the conflict graph that uses the fewest number of colors.

FIGS. 7A-7D illustrates a colored conflict graph according to at least one example embodiment. For example, FIGS. 7A-7D show an example related to operations 625-650 in FIG. 6. In FIGS. 7A-7D the vertex Vi selected in operation 625 is represented by the vertex "i" and vertices "j", "k", "x", and "y" are identified in operation 630 as being adjacent (or linked) to vertex "i" (i.e., Adj(i)={j, k, x, y}.

FIG. 7A represents a scenario where all adjacent vertices j, k, x, and y are uncolored. The set of existing colors in the graph (i.e., V_1 in FIG. 6) is empty. In this case, the network element 151 selects a new color 'c' (i.e., yellow) in operation 645 and assigns the color yellow to vertex i. The set of existing colors V_1 is updated to include the color yellow. FIG. 7B illustrates another scenario in which the set of existing colors V_1 already includes the color yellow (and also blue). Here, since none of vertices j, k, x, and y are colored with yellow, the network element 151 performs operation 640 by assigning yellow (or even blue because the other vertices are still uncolored) to vertex i.

Figure 7C:
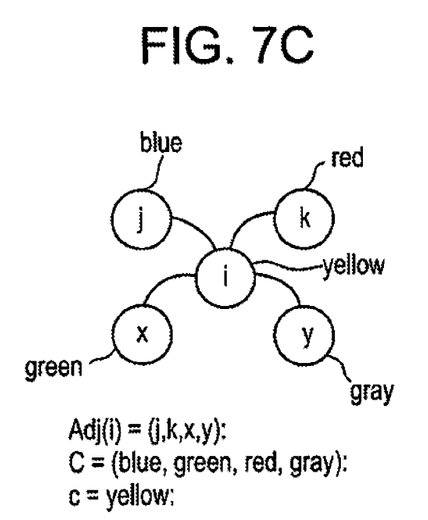

FIG. 7C shows a scenario where the set of existing colors V_1 includes the colors already assigned to vertices linked to vertex i. In this case, the network element 151 performs operations 645 and 650 to select a new color 'c' (i.e., yellow) and update the set of existing colors V_1 to include the color yellow.

Figure 7D:
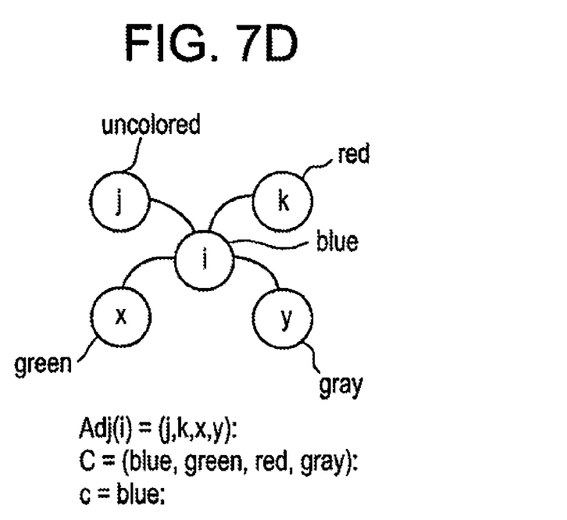

FIG. 7D shows a scenario where the network element 151 assigns the color blue to vertex T because none of the vertices linked to vertex T have the color blue and because the color blue is already in the existing set of colors V_1.

It should be understood that the operations described above allow for improved performance of the network because example embodiments allow for the ability to cache more packets of the more popular files at destination devices 200, increase (or alternatively, maximize) the amount of distinct packets of each file collectively cached by the destination devices 200, and allow coded multicast transmissions within a full set of requested packets of the data files. Furthermore, by combining requested packets prior to transmission it should be understood that delivery methods and/or devices according to at least one example embodiment may reduce the number of transmissions of the network element 151 which may reduce consumption and improve network efficiency.

Variations of the example embodiments are not to be regarded as a departure from the spirit and scope of the example embodiments. All such variations as would be apparent to one skilled in the art are intended to be included within the scope of this disclosure.

What is claimed is:

1. A method for transmitting data files in a network, comprising:
   receiving requests from destination devices for packets of the data files;
   constructing a conflict graph such that (i) each packet requested by each destination device is represented by a distinct vertex in a plurality of vertices of the conflict graph, (ii) the plurality of vertices are associated with the destination devices, and (iii) links are created between the plurality of vertices based on which of the plurality of vertices represent a same requested packet and which requested packets are stored in caches belonging to the destination devices;
   assigning the plurality of vertices to groups based on the links;
   coloring the plurality of vertices based on the assigning to label the requested packets;
   combining the packets represented by vertices having a same color; and
   sending the combined packets.

2. The method of claim 1, wherein the links are created such that a link between a first and a second of the plurality of vertices if (i) the first and second vertices do not represent a same packet, and (ii) a packet represented by the first vertex is not stored in a cache of a destination device associated with the second vertex, or the packet represented by the second vertex is not stored in a cache of a destination device associated with the first vertex.

3. The method of claim 1, wherein the groups indicate a number of links to the plurality of vertices.

4. The method of claim 3, wherein the coloring includes,
   determining which of the plurality of vertices have a fewest number of links and which of the plurality of vertices have a greatest number of links,
   calculating a threshold value based on the number of links to the vertex with the fewest number of links and number of links to the vertex with the greatest number of links, and
   constructing a subset of the plurality of vertices based on the threshold value.

5. The method of claim 4, wherein the coloring includes,
   selecting a vertex from the subset,
   determining colors of vertices linked to the selected vertex, and
   coloring the selected vertex based on the determining.

6. The method of claim 5, wherein,
   the determining colors identifies colors of vertices linked to the selected vertex as a first set of colors and existing colors of the conflict graph as a second set of colors, and
   the coloring the selected vertex includes,
      coloring the selected vertex with a desired color in the second set if the first set of colors and the second set of colors do not coincide, and
      coloring the selected vertex with a new color if the first set of colors and the second set of colors coincide.

7. The method of claim 6, wherein the coloring is performed until the plurality of vertices are colored.

8. The method of claim 7, further comprising:
   updating the second set of colors to include colors of the plurality of colored vertices.

9. The method of claim 8, further comprising:
   performing a local search on the plurality of colored vertices to reduce the number of colors in the second set, the performing a local search including,
      selecting a color from existing colors of the conflict graph,
      identifying vertices with the selected color, and
      replacing the selected color with a different color chosen from the existing colors if vertices linked to the identified vertices are not colored with the different color.

10. The method of claim 1, wherein the combining performs exclusive-OR operations or other linear combination operations on the packets represented by the vertices having the same color.

11. A network element, comprising:
   a memory having computer readable instructions stored thereon; and
   at least one processor configured to execute the computer readable instructions to,
      receive requests from destination devices for packets of the data files;
      construct a conflict graph such that (i) each packet requested by each destination device is represented by a distinct vertex in a plurality of vertices of the conflict graph, (ii) the plurality of vertices are associated with the destination devices, and (iii) links are created between the plurality of vertices based on which of the plurality of vertices represent a same requested packet and which requested packets are stored in caches belonging to the destination devices;
      assign the plurality of vertices to groups based on the links;
      color the plurality of vertices based on the assigning to label the requested packets;
      combine the packets represented by vertices having a same color; and
      send the combined packets.

12. The network element of claim 11, wherein the links are created such that a link between a first and a second of the plurality of vertices if (i) the first and second vertices do not represent a same packet, and (ii) a packet represented by the first vertex is not stored in a cache of a destination device associated with the second vertex, or the packet represented by the second vertex is not stored in a cache of a destination device associated with the first vertex.

13. The network element of claim 11, wherein the groups indicate a number of links to the plurality of vertices.

14. The network element of claim 13, wherein the at least one processor is configured to execute the computer readable instructions to:
   determine which of the plurality of vertices have a fewest number of links and which of the plurality of vertices have a greatest number of links, calculate a threshold value based on the number of links to the vertex with the fewest number of links and on the number of links to the vertex with the greatest number of links, and construct a subset of the plurality of vertices based on the threshold value.

15. The network element of claim 14, wherein the at least one processor is configured to execute the computer readable instructions to:

select a vertex from the subset, determine colors of vertices linked to the selected vertex, and color the selected vertex based on the determining.

16. The network element of claim 15, wherein the at least one processor is configured to execute the computer readable instructions to:

identify colors of vertices linked to the selected vertex as a first set of colors and existing colors of the conflict graph as a second set of colors, color the selected vertex with a desired color in the second set if the first set of colors and the second set of colors do not coincide, and color the selected vertex with a new color if the first set of colors and the second set of colors coincide.

17. The network element of claim 16, wherein the at least one processor is configured to execute the computer readable instructions to:

color until the plurality of vertices are colored.

18. The network element of claim 17, wherein the at least one processor is configured to execute the computer readable instructions to:

update the second set of colors to include colors of the plurality of colored vertices.

19. The network element of claim 18, wherein the at least one processor is configured to execute the computer readable instructions to:

perform a local search on the plurality of colored vertices to reduce the number of colors in the second set by, selecting a color from existing colors of the conflict graph, identifying vertices with the selected color, and replacing the selected color with a different color chosen from the existing colors if vertices linked to the identified vertices are not colored with the different color.

20. The network element of claim 11, wherein the at least one processor is configured to execute the computer readable instructions to:

combine by performing exclusive-OR operations or other linear combination operations on the packets represented by the vertices having the same color.

* * * * *